United States Patent
Iwase et al.

(10) Patent No.: US 9,759,144 B2
(45) Date of Patent: Sep. 12, 2017

(54) ENGINE (71) Applicant: YANMAR CO., LTD., Osaka-shi, Osaka (JP)

(72) Inventors: Atsuhito Iwase, Osaka (JP); Yusuke Amari, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 0 days.

(21) Appl. No.: 15/027,847

(22) PCT Filed: Oct. 3, 2014

(86) PCT No.: PCT/JP2014/076503
§ 371 (c)(1),
(2) Date: Apr. 7, 2016

(87) PCT Pub. No.: WO2015/053172
PCT Pub. Date: Apr. 16, 2015

(65) Prior Publication Data
US 2016/0245201 A1  Aug. 25, 2016

(30) Foreign Application Priority Data
Oct. 9, 2013 (JP) ................................. 2013-212237

(51) Int. Cl.
F02D 41/00 (2006.01)
F02D 41/14 (2006.01)
(Continued)

(52) U.S. Cl.
CPC ..... F02D 41/0052 (2013.01); F02D 41/0072 (2013.01); F02D 41/0077 (2013.01);
(Continued)

(58) Field of Classification Search
CPC ............ F02D 41/0052; F02D 41/0072; F02D 41/0077; F02D 41/1448; F02D 41/145; F02M 26/47; F02M 26/53
(Continued)

(56) References Cited

U.S. PATENT DOCUMENTS 5,964,820 A   10/1999 Miwa et al.
7,219,002 B2   5/2007 Negishi et al.
(Continued)

FOREIGN PATENT DOCUMENTS

JP  H06-336957 A  12/1994
JP  H10-141150 A   5/1998
(Continued)

OTHER PUBLICATIONS

PCT/JP2014/076503, International Search Report dated Jan. 6, 2015, 4 pages.

*Primary Examiner* — Mahmoud Gimie
(74) *Attorney, Agent, or Firm* — Sterne, Kessler, Goldstein & Fox P.L.L.C.

(57) ABSTRACT

Provided is an engine which is provided with an EGR device, wherein: an actual intake/exhaust gas pressure ratio $\pi 1$ of an intake-gas pressure P1 to an exhaust-gas pressure P2 is calculated from the detected exhaust-gas pressure P2 and the detected intake-gas pressure P1; an estimated intake/exhaust gas pressure ratio $\pi 2$ of the intake-gas pressure P1 to the exhaust-gas pressure P2 is calculated from an engine rotational frequency N, and a fuel injection amount F; and, in cases when the actual intake/exhaust gas pressure ratio $\pi 1$ is less than a prescribed value $\pi 0$, an EGR gas weight Megr is calculated based on the actual intake/exhaust gas pressure ratio $\pi 1$, and in cases when the actual intake/exhaust gas pressure ratio $\pi 1$ is equal to or more than the prescribed
(Continued)

value $\pi 0$, the EGR gas weight Megr is calculated based on the estimated intake/exhaust gas pressure ratio $\pi 2$.

3 Claims, 8 Drawing Sheets (51) Int. Cl.
*F02M 26/47* (2016.01)
*F02M 26/53* (2016.01)
*F02M 26/48* (2016.01)

(52) U.S. Cl.
CPC ....... *F02D 41/145* (2013.01); *F02D 41/1448* (2013.01); *F02M 26/47* (2016.02); *F02M 26/53* (2016.02); *F02D 2200/0406* (2013.01); *F02D 2200/0408* (2013.01); *F02D 2200/0614* (2013.01); *F02D 2200/101* (2013.01); *F02D 2250/34* (2013.01); *F02M 26/48* (2016.02); *Y02T 10/47* (2013.01)

(58) Field of Classification Search
USPC ........................................ 123/568.21, 568.11
See application file for complete search history.

(56) References Cited

U.S. PATENT DOCUMENTS

2006/0266033 A1    11/2006  Negishi et al.
2012/0290195 A1*   11/2012  Irie .................... F02D 13/0238
                                                                701/104

FOREIGN PATENT DOCUMENTS

| JP | 2006-329167 A | 12/2006 |
| JP | 2011-43150 A  | 3/2011  |
| JP | 2012-31740 A  | 2/2012  |

* cited by examiner

ENGINE

TECHNICAL FIELD

The present invention relates to an engine. Concretely, the present invention relates to an engine in which a part of exhaust gas is flowed back to intake air.

BACKGROUND ART

Conventionally, an engine provided therein with an EGR device (exhaust gas recirculation system) which flows back a part of exhaust gas to intake air is known. By flowing back the exhaust gas whose oxygen concentration is low (EGR gas) to the intake air by the EGR device, combustion temperature is reduced so as to suppress generating of nitrogen oxide. A weight of the EGR gas flowed back to the intake air (target EGR gas flow rate) is calculated from a target flow rate map based on a differential pressure of an intake pressure and an exhaust pressure (intake/exhaust differential pressure) and an opening degree of an EGR valve controlling a flow rate of the EGR gas (EGR valve opening degree). For example, an art described in the Patent Literature 1 is so.

In the EGR device described in the Patent Literature 1, the EGR gas weight is calculated from one target flow rate map. Namely, the EGR gas weight is calculated uniquely from the intake/exhaust differential pressure and the EGR valve opening degree. However, influence caused by variation of a pressure ratio of the intake pressure concerning the exhaust pressure (intake/exhaust pressure ratio) applied to the calculated EGR gas weight is increased following approach of the pressure ratio to 1. Driving state of the engine is not determined uniquely from the intake/exhaust differential pressure and the EGR valve opening degree. Namely, though the driving state of the engine is different, the same EGR gas weight is calculated when the intake/exhaust differential pressure and the EGR valve opening degree are fixed. Accordingly, in the engine, a calculation error of the EGR gas weight may be increased by influence of the intake/exhaust pressure ratio and influence of an error of the driving state of the engine assumed from the intake/exhaust differential pressure and the EGR valve opening degree.

PRIOR ART REFERENCE

Patent Literature

Patent Literature 1: the Japanese Patent Laid Open Gazette 2012-31740

DISCLOSURE OF INVENTION

Problems to be Solved by the Invention

The present invention is provided in consideration of the conditions as mentioned above, and the purpose of the invention is to provide an engine in which a calculation error of an EGR gas weight can be suppressed based on driving state of the engine.

Means for Solving the Problems

According to the present invention, an engine includes an EGR device which flows back a part of exhaust gas to intake air as EGR gas. An actual intake/exhaust pressure ratio of intake pressure concerning exhaust pressure is calculated from detected exhaust pressure and detected intake pressure. An estimated intake/exhaust pressure ratio of the intake pressure concerning the exhaust pressure is calculated from an engine rotation speed and a fuel injection amount. An EGR gas weight is calculated based on the actual intake/exhaust pressure ratio when the actual intake/exhaust pressure ratio is less than a predetermined value, and the EGR gas weight is calculated based on the estimated intake/exhaust pressure ratio when the actual intake/exhaust pressure ratio is not less than the predetermined value.

According to the present invention, a plurality of effective passage sectional area maps calculating an effective passage sectional area of the EGR device from an opening degree of an EGR valve restricting a flow rate of the EGR gas and a differential pressure of the exhaust pressure and the intake pressure are provided. The EGR gas weight is calculated from an effective passage sectional area map selected based on the engine rotation speed and the fuel injection amount.

According to the present invention, a plurality of effective passage sectional area maps calculating an effective passage sectional area of the EGR device from an opening degree of an EGR valve restricting a flow rate of the EGR gas and a differential pressure of the exhaust pressure and the intake pressure are provided. The EGR gas weight is calculated from an effective passage sectional area map selected based on the actual intake/exhaust pressure ratio and the exhaust pressure when the actual intake/exhaust pressure ratio is less than the predetermined value. The EGR gas weight is calculated from an effective passage sectional area map selected based on the estimated intake/exhaust pressure ratio and the exhaust pressure when the intake/exhaust pressure ratio is not less than the predetermined value.

Effect of the Invention

The present invention brings the following effects.

According to the present invention, at the time of calculating the EGR gas weight, the EGR gas weight can be calculated stably in the driving state in which influence of the pressure ratio of the intake pressure concerning the exhaust pressure is large. Accordingly, a calculation error of the EGR gas weight can be suppressed based on the driving state.

According to the present invention, the effective passage sectional area map corresponding to the driving state of the engine is selected from the plurality of the effective passage sectional area maps. Accordingly, the calculation error of the EGR gas weight Megr can be suppressed based on the driving state of the engine.

According to the present invention, the effective passage sectional area map corresponding to the driving state of the engine is selected from the plurality of the effective passage sectional area maps in consideration of the influence of the pressure ratio of the intake pressure concerning the exhaust pressure. Accordingly, the calculation error of the EGR gas weight can be suppressed based on the driving state.

DETAILED DESCRIPTION OF THE INVENTION

Figure 1:
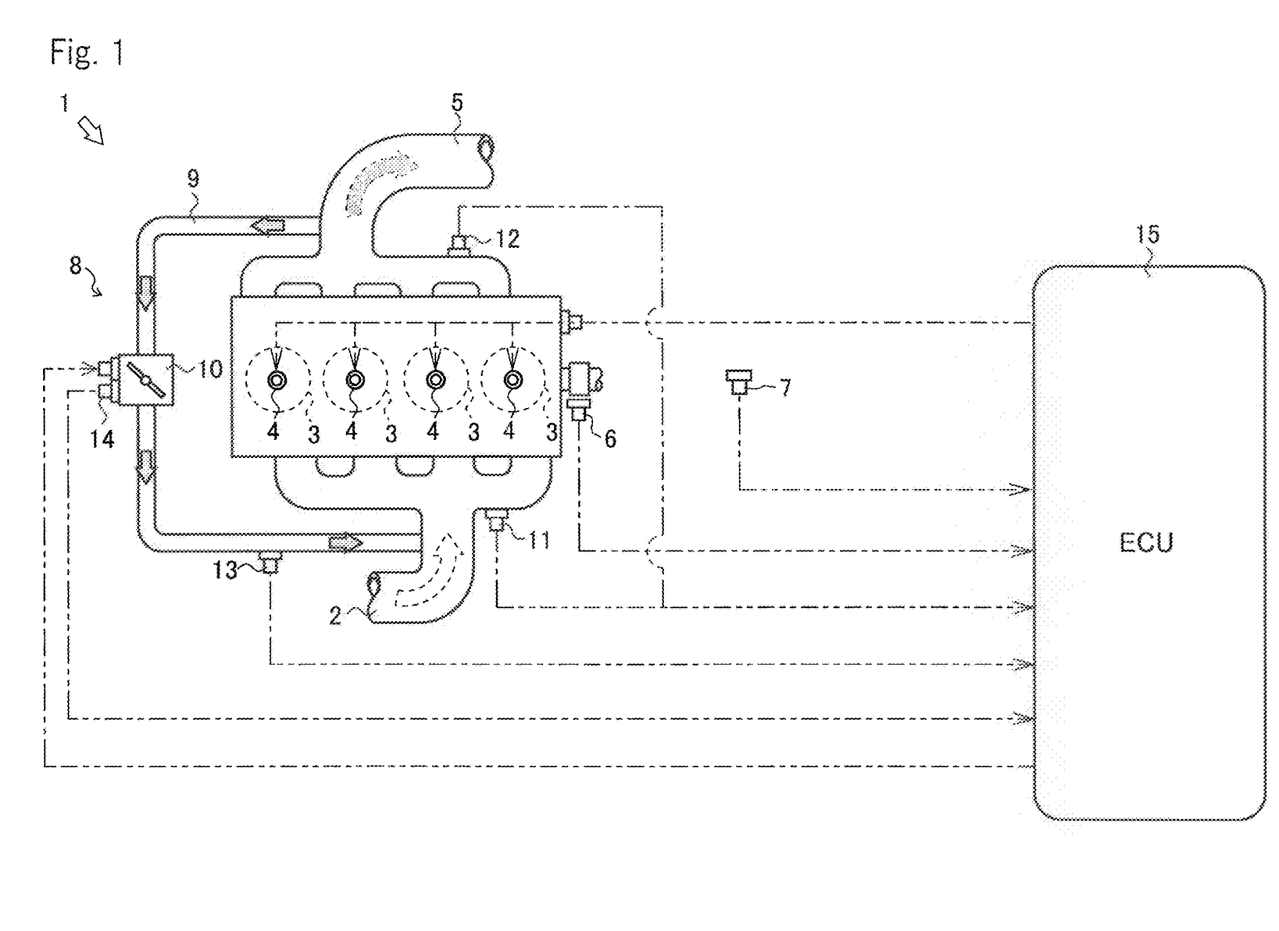
FIG. 1 is a schematic drawing of an engine according to the present invention.

An engine 1 according to a first embodiment of the present invention is explained referring to FIG. 1.

As shown in FIG. 1, the engine 1 is a diesel engine, and is an in-line four-cylinder engine having four cylinders 3.

In the engine 1, intake air supplied into the cylinders 3 via an intake pipe 2 and fuel supplied into the cylinders 3 from fuel injection valves 4 are mixed and burnt inside the cylinders 3 so as to drive rotatively an output shaft. The engine 1 discharges exhaust gas generated by the combustion of the fuel to the outside via an exhaust pipe 5.

The engine 1 has an engine rotation speed detection sensor 6, an injection amount detection sensor 7 of the fuel injection valves, an EGR device 8 and an ECU 15 which is a control device.

The engine rotation speed detection sensor 6 detects a rotation speed N which is an engine rotation speed of the engine 1. The engine rotation speed detection sensor 6 includes a sensor and a pulsar, and is provided on the output shaft of the engine 1. Though the engine rotation speed detection sensor 6 includes the sensor and the pulsar in this embodiment, any member which can detect the rotation speed N may be used.

The injection amount detection sensor 7 detects an injection amount F which is a fuel injection amount from the fuel injection valves 4. The injection amount detection sensor 7 is provided in a middle part of a fuel supply pipe (not shown). The injection amount detection sensor 7 includes a flow rate sensor. Though the injection amount detection sensor 7 includes the flow rate sensor in this embodiment, the present invention is not limited thereto and any member which can detect the injection amount F of the fuel may be used.

The EGR device 8 flows back a part of exhaust gas to intake air. The EGR device 8 has an EGR pipe 9, an EGR valve 10, an intake pressure detection sensor 11, an exhaust pressure detection sensor 12, an EGR gas temperature detection sensor 13, an opening degree detection sensor 14, and the ECU 15 which is an EGR control part.

The EGR pipe 9 guides exhaust gas to the intake pipe 2. The EGR pipe 9 is provided so as to communicate the intake pipe 2 with the exhaust pipe 5. Accordingly, a part of exhaust gas passing through the exhaust pipe 5 is guided through the EGR pipe 9 to the intake pipe 2. Namely, a part of exhaust gas can be flowed back to intake air as EGR gas (hereinafter, simply referred to as "EGR gas").

The EGR valve 10 restricts flow rate of EGR gas passing through the EGR pipe 9. The EGR valve 10 includes a normal closed type electromagnetic flow rate restriction valve. The EGR valve 10 is provided in a middle part of the EGR pipe 9. The EGR valve 10 can obtain a signal from the ECU 15 and change opening degree of the EGR valve 10. Though the EGR valve 10 includes the normal closed type electromagnetic flow rate restriction valve in this embodiment, any member which can change flow rate of EGR gas may be used.

The intake pressure detection sensor 11 constituting a differential pressure detection means detects an intake pressure P1. The intake pressure detection sensor 11 is arranged in a middle part of the intake pipe 2 in which the intake pressure P1 can be detected. Similarly, the exhaust pressure detection sensor 12 constituting the differential pressure detection means detects an exhaust pressure P2. The exhaust pressure detection sensor 12 is arranged in a middle part of the exhaust pipe 5 in which the exhaust pressure P2 can be detected.

The EGR gas temperature detection sensor 13 detects an EGR gas temperature Tegr. The EGR gas temperature detection sensor 13 includes a thermocouple. The EGR gas temperature detection sensor 13 is arranged in a middle part of the EGR pipe 9 in which the EGR gas temperature Tegr can be detected. Though the EGR gas temperature detection sensor 13 includes the thermocouple in this embodiment, any member which can detect the EGR gas temperature Tegr may be used.

The opening degree detection sensor 14 detects an EGR valve opening degree G. The opening degree detection sensor 14 includes a position detection sensor. The opening degree detection sensor 14 is provided in the EGR valve 10. Though the opening degree detection sensor 14 includes the position detection sensor in this embodiment, any member which can detect the EGR valve opening degree G may be used.

The ECU 15 controls the engine 1. Concretely, a main body of the engine 1 and the EGR device 8 are controlled. In the ECU 15, various programs and data are stored so as to control the engine 1. The ECU 15 may be configured by connecting a CPU, a ROM, a RAM, a HDD and the like with a bus, or may alternatively be a one-chip LSI or the like.

The ECU 15 is connected to the fuel injection valves 4 and can control the fuel injection valves 4.

The ECU 15 is connected to the engine rotation speed detection sensor 6 and can obtain the rotation speed N detected by the engine rotation speed detection sensor 6.

The ECU 15 is connected to the injection amount detection sensor 7 and can obtain the injection amount F detected by the injection amount detection sensor 7.

The ECU 15 is connected to the EGR valve 10 and can control opening and closing of the EGR valve 10.

The ECU 15 is connected to the intake pressure detection sensor 11 and the exhaust pressure detection sensor 12, and can obtain the intake pressure P1 detected by the intake pressure detection sensor 11 and the exhaust pressure P2 detected by the exhaust pressure detection sensor 12 and calculate an EGR difference pressure ΔP which is a difference of the detected exhaust pressure P2 and the detected intake pressure P1 and an actual intake/exhaust pressure ratio π1 which is an actual pressure ratio of the detected intake pressure P1 concerning the detected exhaust pressure P2.

The ECU 15 is connected to the EGR gas temperature detection sensor 13 and can obtain the EGR gas temperature Tegr detected by the EGR gas temperature detection sensor 13.

The ECU 15 is connected to the opening degree detection sensor 14 and can obtain the EGR valve opening degree G detected by the opening degree detection sensor 14.

In the ECU 15, an estimated intake/exhaust pressure ratio map Mw is stored so as to calculate an estimated intake/exhaust pressure ratio π2 which is a pressure ratio of the intake pressure P1 concerning the exhaust pressure P2 based on the rotation speed N and the injection amount F. Furthermore, in the ECU 15, a predetermined value π0 which is a threshold of an intake/exhaust pressure ratio π at which influence caused by variation of the intake/exhaust pressure ratio π is excessive is stored.

In the ECU 15, effective passage sectional area maps M1, M2, ... Mn (in this embodiment, effective passage sectional area maps M1, M2, M3 and M4) are stored so as to calculate an effective passage sectional area Ared of the EGR device 8 based on the EGR valve opening degree G and the EGR difference pressure ΔP. In the ECU 15, a selection map My is stored so as to select one effective passage sectional area map Mx from the effective passage sectional area maps M1, M2, M3 and M4 based on the rotation speed N and the injection amount F.

The ECU 15 can calculate the estimated intake/exhaust pressure ratio π2 from the estimated intake/exhaust pressure ratio map Mw based on the obtained rotation speed N and the obtained injection amount F. Similarly, the ECU 15 can select the effective passage sectional area map Mx from the selection map My based on the obtained rotation speed N and the obtained injection amount F. The effective passage sectional area Ared can be calculated from the selected effective passage sectional area map Mx based on the intake pressure P1, the exhaust pressure P2, the EGR gas temperature Tegr and the EGR valve opening degree G.

A control mode calculating an EGR gas weight Megr of the EGR device 8 of the engine 1 according to the first embodiment of the present invention is explained referring to FIGS. 2 to 7.

The ECU 15 calculates the EGR difference pressure ΔP shown by a below formula 1 based on the obtained intake pressure P1 and the obtained exhaust pressure P2, and calculates the intake/exhaust pressure ratio π shown by a below formula 2. Simultaneously, the ECU 15 calculates the estimated intake/exhaust pressure ratio π2 based on the obtained rotation speed N and the obtained injection amount F.

Figure 2:
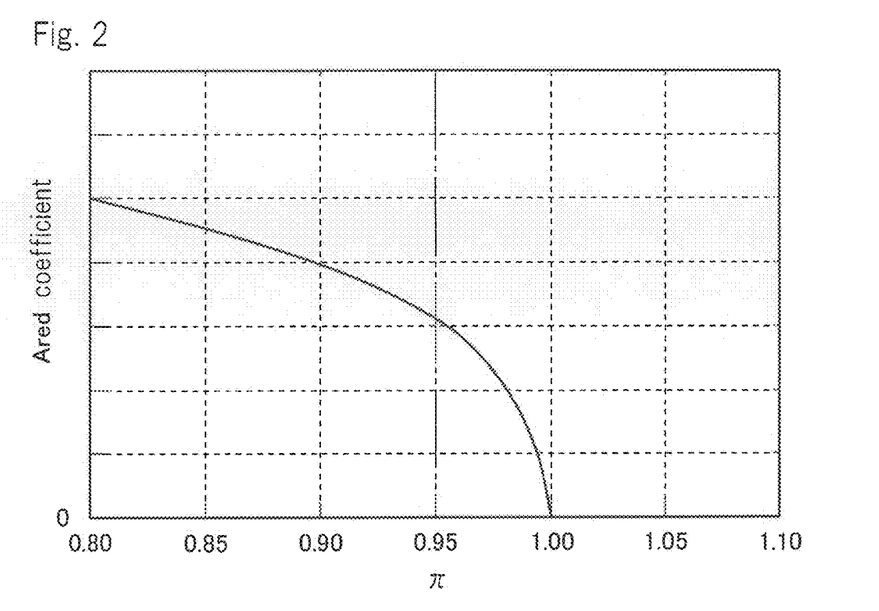
FIG. 2 is a graph of relation of intake/exhaust pressure ratio and effective passage sectional area of an EGR device of a first embodiment of the engine according to the present invention.

As shown in FIG. 2, an Ared coefficient (see a formula 3) calculated from the exhaust pressure P2, the EGR gas temperature Tegr, the intake/exhaust pressure ratio π (the actual intake/exhaust pressure ratio π1 or the estimated intake/exhaust pressure ratio π2), and an exhaust specific heat κ and a gas constant R which is constants is reduced following approaching of the intake/exhaust pressure ratio π to 1, and the Ared coefficient is 0 when the intake/exhaust pressure ratio π is 1. At this time, the Ared coefficient is reduced suddenly following approaching of the intake/exhaust pressure ratio π to 1. Namely, the Ared coefficient calculated from the actual intake/exhaust pressure ratio π1 is variated widely by a minute measurement error of the detected intake pressure P1 and the detected exhaust pressure P2.

Figure 3:
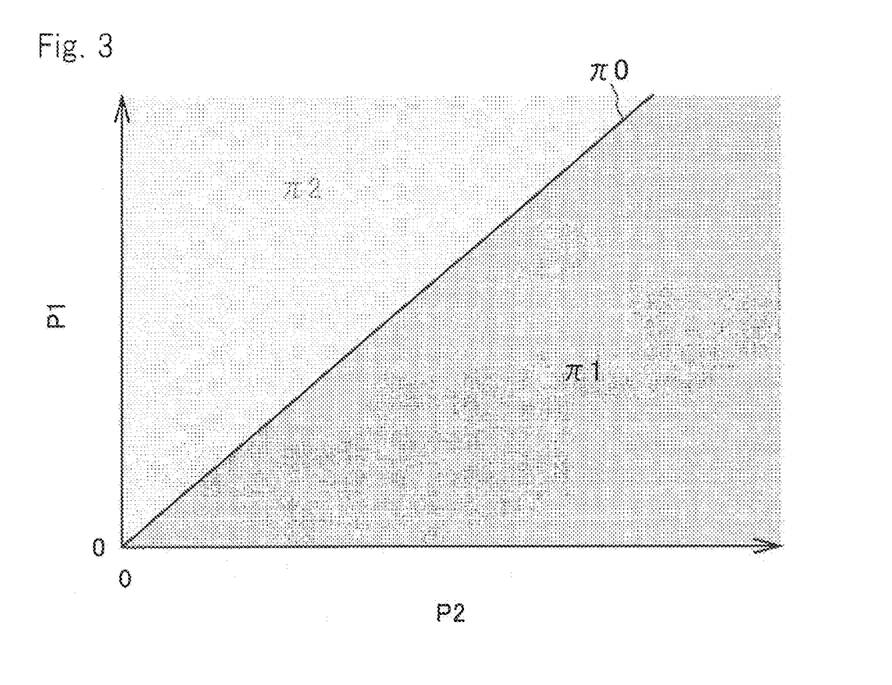
FIG. 3 is a graph of threshold of the effective passage sectional area of the EGR device of the first embodiment of the engine according to the present invention.

Accordingly, as shown in FIG. 3, the ECU 15 adopts the predetermined value π0 at which the Ared coefficient is reduced suddenly as the threshold, and selects the actual intake/exhaust pressure ratio π1 when the actual intake/exhaust pressure ratio π1 is smaller than the predetermined value π0. When the actual intake/exhaust pressure ratio π1 is not less than the predetermined value π0, the estimated intake/exhaust pressure ratio π2 calculated from the estimated intake/exhaust pressure ratio map Mw is selected so as to suppress sudden reduction of the Ared coefficient.

Figure 4:
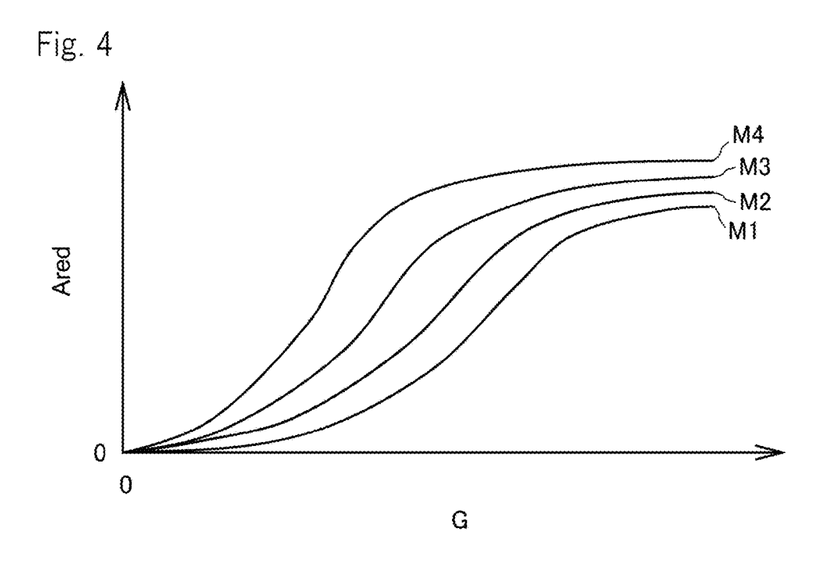
FIG. 4 is a graph of the effective passage sectional area of the EGR device under predetermined conditions at the same differential pressure of the engine according to the present invention.
Figure 5:
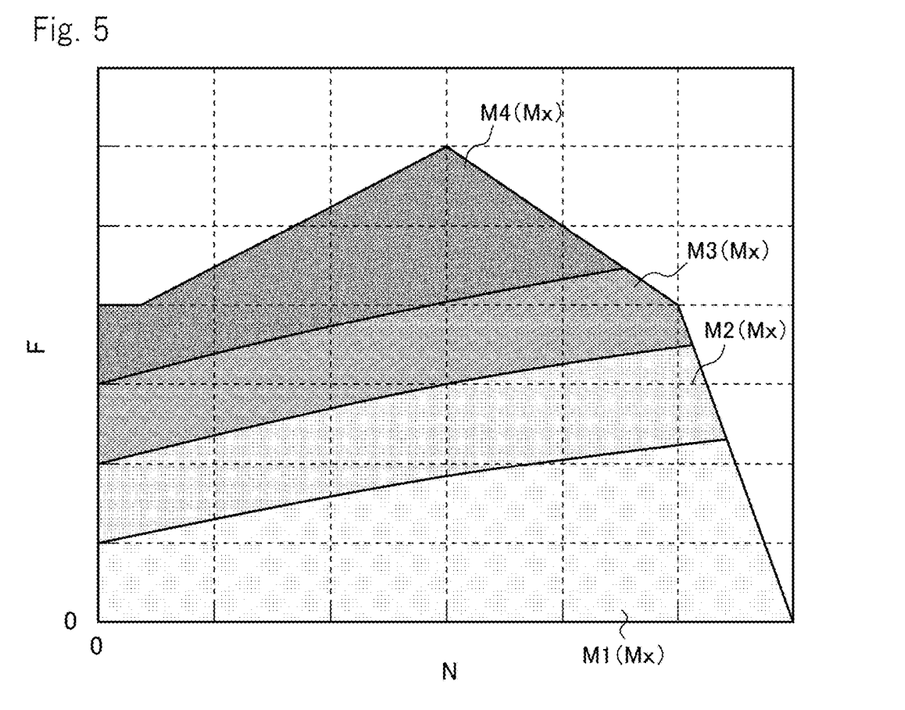
FIG. 5 is a diagram of a selection map of the engine according to the present invention.
Figure 6:
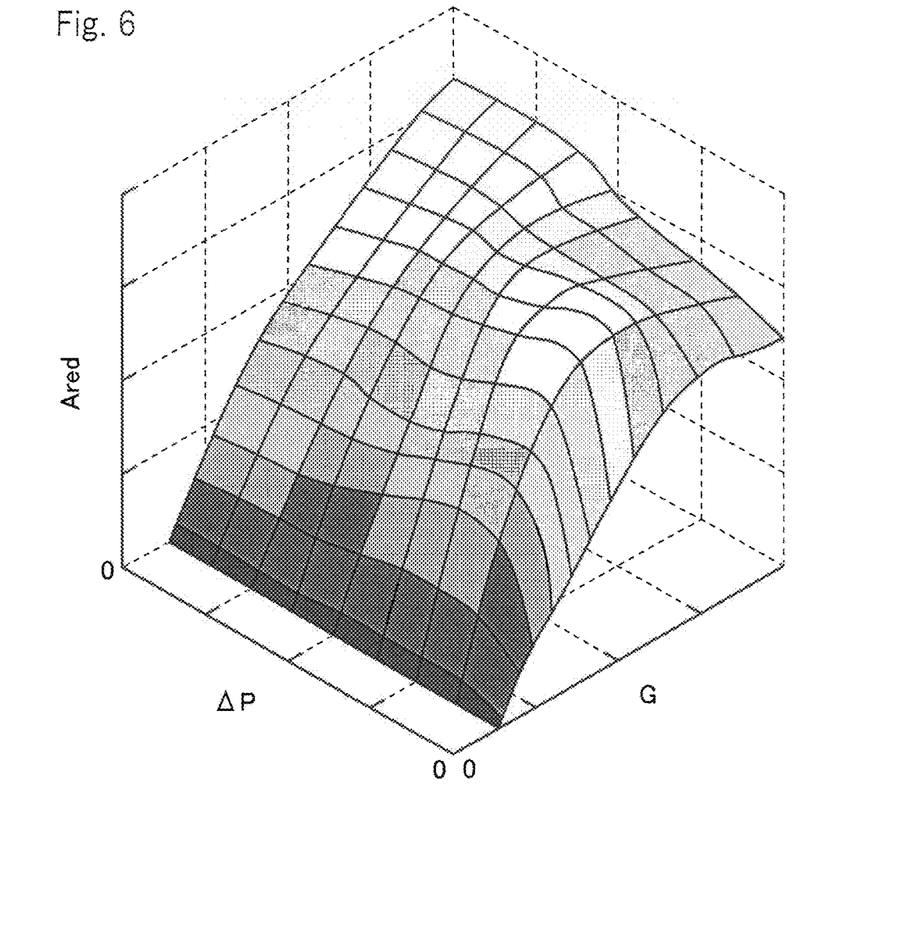
FIG. 6 is a graph of EGR gas weight of the EGR device under predetermined conditions of the engine according to the present invention.

As shown in FIG. 4, the effective passage sectional area Ared is different concerning operation state of the engine 1 (the rotation speed N and the injection amount F) even when the EGR difference pressure ΔP and the EGR valve opening degree G are fixed. Accordingly, as shown in FIG. 5, the ECU 15 selects the effective passage sectional area map Mx from the selection map My based on the obtained rotation speed N and the obtained injection amount F. Furthermore, as shown in FIG. 6, the ECU 15 calculates the effective passage sectional area Ared from the effective passage sectional area map Mx selected based on the calculated EGR difference pressure ΔP and the obtained EGR valve opening degree G.

Then, the ECU 15 calculates the Ared coefficient from the obtained exhaust pressure P2, the EGR gas temperature Tegr, the intake/exhaust pressure ratio π, and the exhaust specific heat κ and the gas constant R which are constants (see the formula 3). Finally, the ECU 15 calculates the EGR gas weight Megr shown in the formula 3 from the calculated Ared coefficient and the calculated effective passage sectional area Ared.

$$\Delta P = P2 - P1 \quad \text{[Formula 1]}$$

$$\pi = P1/P2 \quad \text{[Formula 2]}$$

$$Megr = Ared \times P2 \times \sqrt{\frac{2 \times \kappa}{(\kappa - 1) \times R \times Tegr} \times \left(\frac{2/\kappa}{\pi} - \pi^{1+1/\kappa}\right)} \quad \text{[Formula 3]}$$

Figure 7:
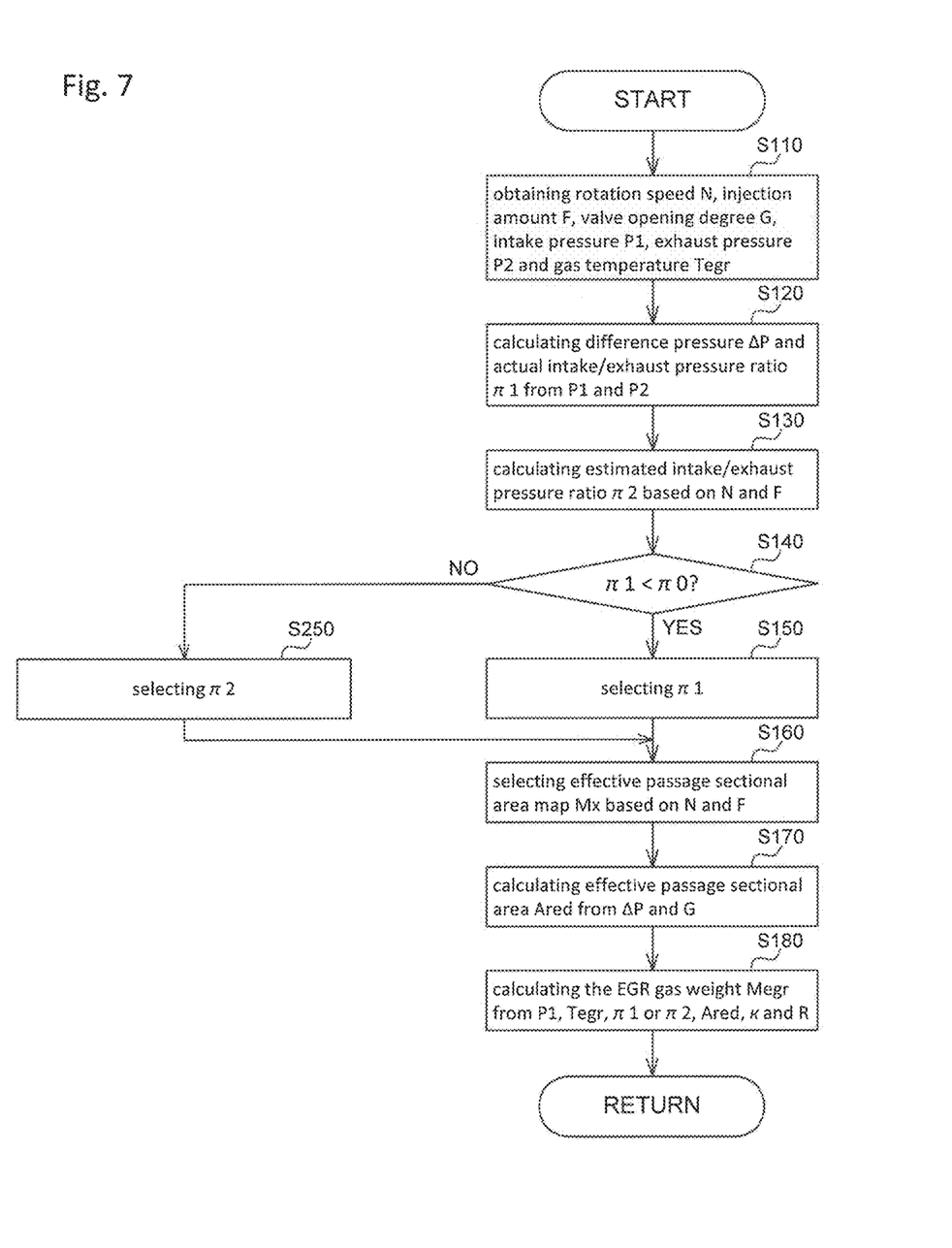
FIG. 7 is a flow chart of a control mode calculating the effective passage sectional area of the EGR device of the first embodiment of the engine according to the present invention.

Next, the control mode calculating the EGR gas weight Megr of the EGR device 8 of the engine 1 is explained concretely.

As shown in FIG. 7, at a step S110, the ECU 15 obtains the rotation speed N detected by the engine rotation speed detection sensor 6, the injection amount F detected by the injection amount detection sensor 7, the EGR valve opening degree G detected by the opening degree detection sensor 14, the intake pressure P1 detected by the intake pressure detection sensor 11, the exhaust pressure P2 detected by the exhaust pressure detection sensor 12, and the EGR gas temperature Tegr detected by the EGR gas temperature detection sensor 13, and shifts to a step S120.

At the step S120, the ECU 15 calculates the EGR difference pressure ΔP and the actual intake/exhaust pressure ratio π1 based on the obtained intake pressure P1 and the obtained exhaust pressure P2, and shifts to a step S130.

At the step S130, the ECU 15 calculates the estimated intake/exhaust pressure ratio π2 from the estimated intake/exhaust pressure ratio map Mw based on the obtained rotation speed N and the obtained injection amount F, and shifts to a step S140.

At the step S140, the ECU 15 judges whether the actual intake/exhaust pressure ratio π1 is less than the predetermined value π0 or not.

As a result, when the actual intake/exhaust pressure ratio π1 is judged to be smaller than the predetermined value π0 (less than π0), the ECU 15 shifts to a step S150.

On the other hand, when the actual intake/exhaust pressure ratio π1 is judged not to be smaller than the predetermined value π0 (not less than π0), the ECU 15 shifts to a step S250.

At the step S150, the ECU 15 selects the actual intake/exhaust pressure ratio π1 from the actual intake/exhaust pressure ratio π1 and the estimated intake/exhaust pressure ratio π2, and shifts to a step S160.

At the step S160, the ECU 15 selects the effective passage sectional area map Mx from the selection map My based on the obtained rotation speed N and the obtained injection amount F, and shifts to a step S170.

At the step S170, the ECU 15 calculates the effective passage sectional area Ared from the effective passage sectional area map Mx based on the calculated EGR difference pressure ΔP and the obtained EGR valve opening degree G, and shifts to a step S180.

At the step S180, the ECU 15 calculates the EGR gas weight Megr from the obtained intake pressure P1, the EGR gas temperature Tegr, the selected one of the actual intake/exhaust pressure ratio π1 and the estimated intake/exhaust pressure ratio π2, the effective passage sectional area Ared, and the exhaust specific heat κ and the gas constant R which are constants, and the ECU 15 shifts to the step S110.

At the step S250, the ECU 15 selects the estimated intake/exhaust pressure ratio π2 from the actual intake/exhaust pressure ratio π1 and the estimated intake/exhaust pressure ratio π2, and shifts to a step S160.

As the above, when the influence caused by variation of the actual intake/exhaust pressure ratio π1 is excessive at the time of calculating the EGR gas weight Megr (the actual intake/exhaust pressure ratio π1 is larger than the predetermined value π0), the ECU 15 selects the estimated intake/exhaust pressure ratio π2 calculated from the estimated intake/exhaust pressure ratio map Mw based on the rotation speed N and the injection amount F. The ECU 15 selects the optimal effective passage sectional area map Mx based on the rotation speed N and the injection amount F.

Accordingly, in the engine 1, at the time of calculating the EGR gas weight Megr, the EGR gas weight Megr can be calculated stably in the driving state in which influence of the pressure ratio of the intake pressure P1 concerning the exhaust pressure P2 is large. Accordingly, a calculation error of the EGR gas weight Megr can be suppressed based on the driving state of the engine 1.

In the engine 1, the effective passage sectional area map corresponding to the driving state of the engine 1 is selected from the effective passage sectional area maps M1, M2, . . . Mn. Accordingly, the calculation error of the EGR gas weight Megr can be suppressed based on the driving state of the engine 1. Furthermore, generating of nitrogen oxide by the EGR device 8 is suppressed.

Figure 8:
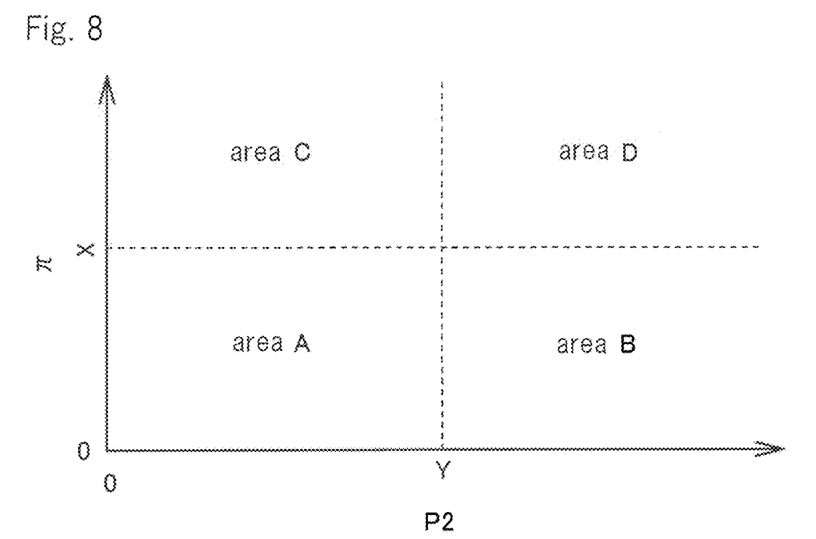
FIG. 8 is a graph of threshold of the effective passage sectional area of the EGR device of a second embodiment of the engine according to the present invention.
Figure 9:
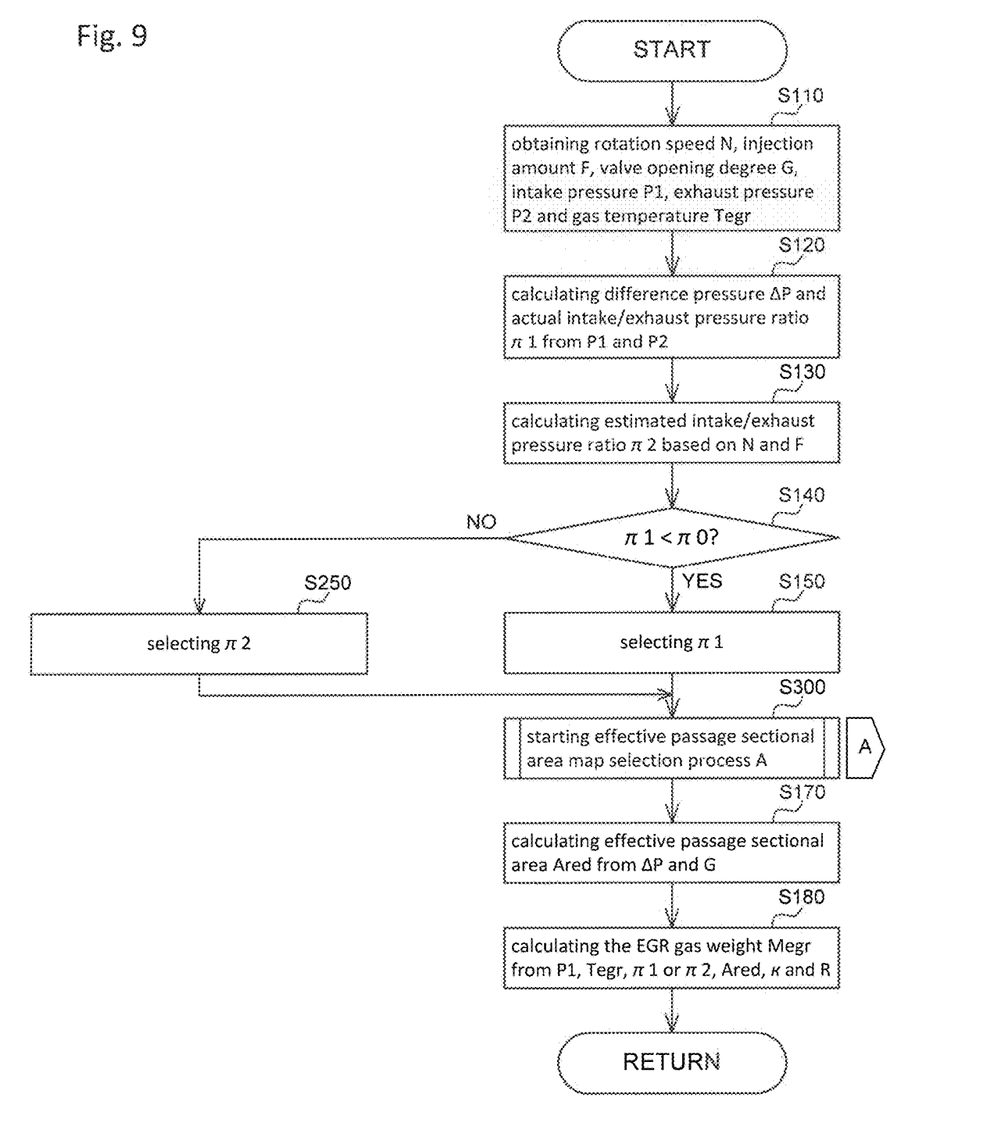
FIG. 9 is a flow chart of a control mode calculating the effective passage sectional area of the EGR device of the second embodiment of the engine according to the present invention.
Figure 10:
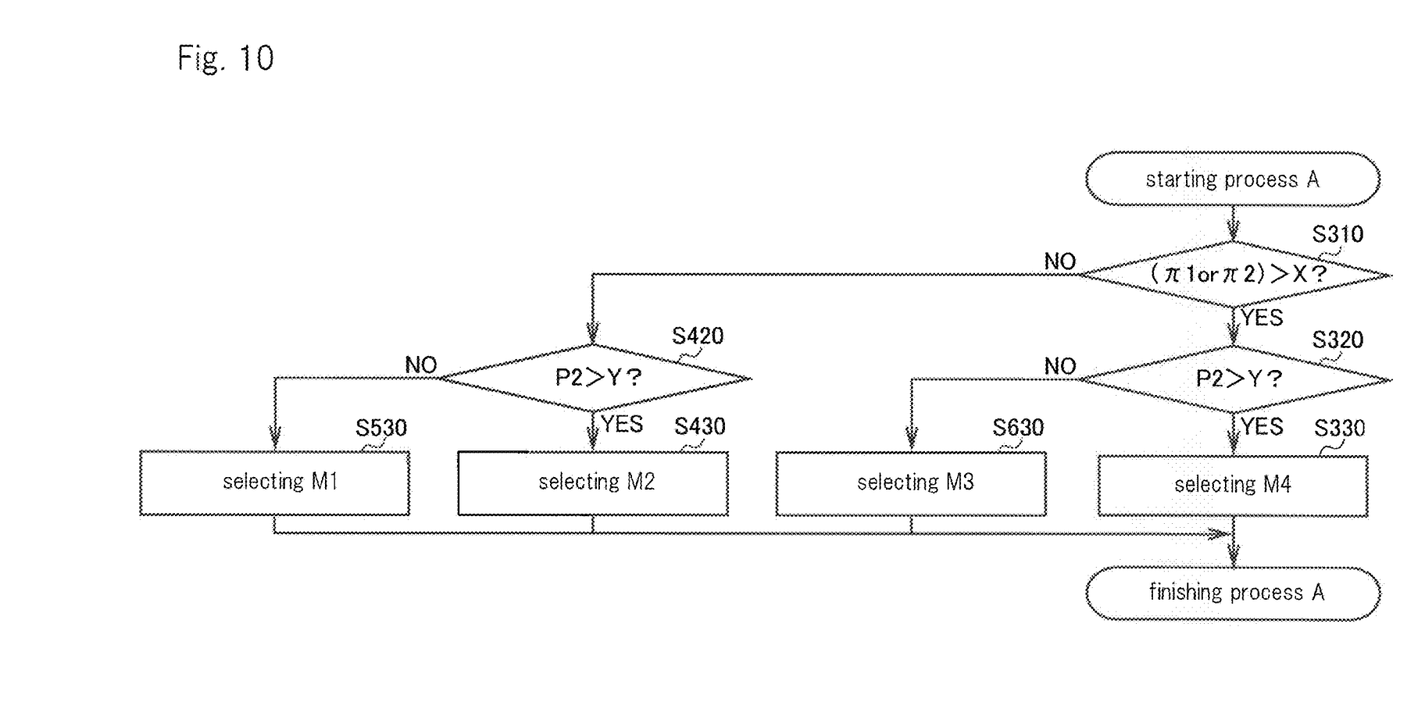
FIG. 10 is a flow chart of a control mode of processes selecting an effective passage sectional area map of the EGR device of the second embodiment of the engine according to the present invention.

Next, an engine 1 which is a second embodiment of the engine 1 according to the present invention is explained referring to FIGS. 8 to 10. A concrete explanation of points similar to the embodiment explained already is omitted, and parts different thereto is explained mainly.

As shown in FIG. 8, based on the exhaust pressure P2 and the intake/exhaust pressure ratio π (the actual intake/exhaust pressure ratio π1 or the estimated intake/exhaust pressure ratio π2), the ECU 15 can select the one effective passage sectional area map Mx from the effective passage sectional area maps M1, M2, . . . , Mn (in this embodiment, the effective passage sectional area maps M1, M2, M3 and M4) so as to calculate the effective passage sectional area Ared.

A control mode calculating the EGR gas weight Megr of the EGR device 8 of the engine 1 according to the second embodiment of the present invention is explained.

As shown in FIG. 8, the ECU 15 selects the one effective passage sectional area map Mx suitable for calculating the effective passage sectional area Ared of the EGR device 8 based on the obtained exhaust pressure P2 and the calculated intake/exhaust pressure ratio π. Concretely, when the intake/exhaust pressure ratio π is larger than a predetermined value X and the exhaust pressure P2 is larger than a predetermined value Y (area D in FIG. 8), the ECU 15 selects the effective passage sectional area map M4. When the intake/exhaust pressure ratio π is larger than the predetermined value X and the exhaust pressure P2 is not more than the predetermined value Y (area C in FIG. 8), the ECU 15 selects the effective passage sectional area map M3. When the intake/exhaust pressure ratio π is not more than the predetermined value X and the exhaust pressure P2 is larger than the predetermined value Y (area B in FIG. 8), the ECU 15 selects the effective passage sectional area map M2. When the intake/exhaust pressure ratio π is not more than the predetermined value X and the exhaust pressure P2 is not more than the predetermined value Y (area A in FIG. 8), the ECU 15 selects the effective passage sectional area map M1.

Next, the control mode calculating the EGR gas weight Megr of the EGR device 8 of the engine 1 is explained concretely.

As shown in FIG. 9, at the steps S110 to S150, the ECU 15 performs the same control as mentioned above.

At a step S300, the ECU 15 starts an effective passage sectional area map selection process A, and shifts to a step S310 (see FIG. 10).

As shown in FIG. 10, at the step S310, the ECU 15 judges whether the intake/exhaust pressure ratio π (the actual intake/exhaust pressure ratio π1 or the estimated intake/exhaust pressure ratio π2) is larger than the predetermined value X or not.

As a result, when the intake/exhaust pressure ratio π is judged to be larger than the predetermined value X, the ECU 15 shifts to a step 3320.

On the other hand, when the intake/exhaust pressure ratio π is judged not to be larger than the predetermined value X, the ECU 15 shifts to a step 3420.

At the step S320, the ECU 15 judges whether the exhaust pressure P2 is larger than the predetermined value Y or not.

As a result, when the exhaust pressure P2 is judged to be larger than the predetermined value Y, the ECU 15 shifts to a step S330.

On the other hand, when the exhaust pressure P2 is judged not to be larger than the predetermined value Y, the ECU 15 shifts to a step S630.

At the step S330, the ECU 15 selects the effective passage sectional area map M4, finishes the effective passage sectional area map selection process A and shifts to the step S170.

At the steps S170 to S180, the ECU 15 performs the same control as mentioned above.

At the step S420, the ECU 15 judges whether the exhaust pressure P2 is larger than the predetermined value Y or not.

As a result, when the exhaust pressure P2 is judged to be larger than the predetermined value Y, the ECU 15 shifts to a step S430.

On the other hand, when the exhaust pressure P2 is judged not to be larger than the predetermined value Y, the ECU 15 shifts to a step S530.

At the step S430, the ECU 15 selects the effective passage sectional area map M2, finishes the effective passage sectional area map selection process A and shifts to the step S170.

At the step S530, the ECU 15 selects the effective passage sectional area map M1, finishes the effective passage sectional area map selection process A and shifts to the step S170.

At the step S630, the ECU 15 selects the effective passage sectional area map M3, finishes the effective passage sectional area map selection process A and shifts to the step S170.

Accordingly, in the engine 1, the effective passage sectional area map Mx corresponding to the driving state of the engine 1 is selected from the effective passage sectional area maps M1, M2, . . . Mn in consideration of the influence of the pressure ratio of the intake pressure P1 concerning the exhaust pressure P2. Accordingly, the calculation error of the EGR gas weight Megr can be suppressed based on the driving state of the engine 1.

INDUSTRIAL APPLICABILITY

The present invention can be used for an engine in which a part of exhaust gas is flowed back to intake air.

DESCRIPTION OF NOTATIONS 1 engine
8 EGR device
N rotation speed
F injection amount
P1 intake pressure
P2 exhaust pressure
$\pi 0$ predetermined value
$\pi 1$ actual intake/exhaust pressure ratio
$\pi 2$ estimated intake/exhaust pressure ratio
Megr EGR gas weight

What is claimed is:

1. An engine comprising an EGR device which flows back a part of exhaust gas to intake air as EGR gas, characterized in that an actual intake/exhaust pressure ratio of intake pressure concerning exhaust pressure is calculated from detected exhaust pressure P2 and detected intake pressure P1, an estimated intake/exhaust pressure ratio of the intake pressure concerning the exhaust pressure is calculated from an engine rotation speed and a fuel injection amount, and an EGR gas weight is calculated based on the actual intake/exhaust pressure ratio when the actual intake/exhaust pressure ratio is less than a predetermined value, and the EGR gas weight is calculated based on the estimated intake/exhaust pressure ratio when the actual intake/exhaust pressure ratio is not less than the predetermined value.

2. The engine according to claim 1, further comprising a plurality of effective passage sectional area maps calculating an effective passage sectional area of the EGR device from an opening degree of an EGR valve restricting a flow rate of the EGR gas and a differential pressure of the exhaust pressure and the intake pressure, wherein the EGR gas weight is calculated from an effective passage sectional area map selected based on the engine rotation speed and the fuel injection amount.

3. The engine according to claim 1, further comprising a plurality of effective passage sectional area maps calculating an effective passage sectional area of the EGR device from an opening degree of an EGR valve restricting a flow rate of the EGR gas and a differential pressure of the exhaust pressure and the intake pressure, wherein the EGR gas weight is calculated from an effective passage sectional area map selected based on the actual intake/exhaust pressure ratio and the exhaust pressure when the actual intake/exhaust pressure ratio is less than the predetermined value, and wherein the EGR gas weight is calculated from an effective passage sectional area map selected based on the estimated intake/exhaust pressure ratio and the exhaust pressure when the actual intake/exhaust pressure ratio is not less than the predetermined value.

* * * * *